United States Patent Office 3,093,647
Patented June 11, 1963

3,093,647
DINICOTINOYL N-ALLYL NORMORPHINE ESTER
Konrad Lothar Zirm, Steiermark, and Alfred Pongratz, Graz, Austria, assignors to Lannacher Heilmittel Gesellschaft m.b.H., Steiermark, Austria
No Drawing. Filed Feb. 26, 1960, Ser. No. 11,141
Claims priority, application Austria Oct. 12, 1959
1 Claim. (Cl. 260—285)

The present invention relates to a new nicotinic acid ester, namely, the dinicotinoyl N-allyl normorphine ester which in view of its special pharmacological properties represents a valuable medicine.

The dinicotinoyl N-allyl normorphine ester has the advantage over N-allyl normorphine that the ester even in quantities of a fraction of one milligram will decrease the paralysing action of opiates on the respiratory center of humans. It furthermore was possible to protect the respiratory center to a far reaching degree in experimental alkaloid poisoning, for example, with morphine.

This new ester is expediently produced by condensing functional derivatives of nicotinic acid, such as nicotinic acid anhydride or nicotinic acid halides in the form of their hydrohalide salts, with N-allyl normorphine. If desired, nicotinic acid itself can be reacted with the N-allyl normorphine in the presence of water absorbing substances, for example, phosphorus oxychloride. In case of the use of nicotinic acid halide hydrogen halide salts, especially nicotinic acid chloride hydrochloride or in the case of nicotinic acid, the condensation with the N-allyl normorphine is preferably effected in the presence of tertiary bases. Examples of such tertiary bases which come into consideration, for instance, are: pyridine, quinoline, dimethyl aniline, or the like. If necessary, the reaction can be effected in the presence of inert solvents, such as alkylbenzenes and chlorobenzenes.

The indicated esterification of N-allyl normorphine causes the above-mentioned modification of its pharmacological properties.

The following examples will serve to illustrate several embodiments of the process suitable for the preparation of the novel esters according to the invention.

*Example 1*

1 part by weight of N-allyl normorphine hydrochloride was introduced with stirring into a melt of 5 parts by weight nicotinic acid anhydride which was heated on a bath maintained at 125–140° C., preferably 130° C., and the melt then maintained at this temperature for 1 hour.

After cooling, the solidified melt was comminuted and dissolved in 500 parts by weight of warm water. The resulting weakly brown coloured solution was decolorized with active carbon and filtered. The filtrate after cooling was adjusted to a pH of 9 with sodium bicarbonate and soda. The compound produced precipitated out directly as glistening spangles which were filtered off, washed with water and dried under vacuum over NaOH at room temperature. The yield was 1.3 parts by weight of dinicotinoyl N-allyl normorphine ester. The ester was purified by warming in 4 parts by weight of n-HCl and 26 parts by weight of water, filtering the resulting solution and evaporating the filtrate down under vacuum over sodium hydroxide. 1.2 parts by weight of glistening crystals were obtained thereby. These crystals were recrystallized by dissolving in 47 parts by weight of alcohol and evaporating down the solution to half its volume under vacuum over sodium hydroxide. The resulting crystals of the hydrochloride of the dinicotinoyl N-allyl normorphine ester were collected on a filter, washed with absolute alcohol and dried. The melting point thereof was 238.0–239.0° C.

The Marquis test (Morphin u. Morphinähnlich wirkende Verbindungen, O. Schaumann, Springer Verlag Berlin-Gottingen-Heidelberg 1957, page 25) upon the new compound was negative, whereas the N-allyl normorphine used as the starting material gives a strong red-violet coloration.

*Example 2*

4.3 parts by weight of nicotinic acid chloride hydrochloride were added to 19 parts by weight of water-free pyridine and 1 part by weight of N-allyl normorphine added thereto. The mixture was heated during 30 minutes on a heating bath to 90° C. and the resulting reaction mass after cooling was introduced into 100 parts by weight of water. Sodium bicarbonate was first added to the resulting solution and then sodium carbonate to adjust its pH to 9, whereby the oily reaction product separated out together with the pyridine. The reaction product was extracted with chloroform. The chloroform and pyridine which also was taken up in the extract were driven off from the extract on a steam bath. n/2-HCl was added to the residue to provide a pH of 4, whereby the hydrochloride of the dinicotinoyl N-allyl normorphine ester crystallized out. Upon evaporating down to dryness under vacuum and over sodium hydroxide 1.1 parts by weight of the crystalline product remained as a residue. The crystalline product was recrystallized from alcohol as in Example 1. The purified product obtained had a melting point of 238–239° C. and was indentical with that of Example 1. The Marquis test thereon was negative.

We claim:
The dinicotinoyl N-allyl normorphine ester.

References Cited in the file of this patent
UNITED STATES PATENTS 2,821,531 Brown _____ Jan. 28, 1958
2,878,253 Zirm et al. _____ Mar. 17, 1959

OTHER REFERENCES

Zirm et al.: Monatshefte für Chemie, vol. 88, pages 330–335 (1957).
Pongratz et al.: Monatshefte für Chemie, vol. 91, pp. 396–399 (1960).